Nov. 11, 1969 F. H. GILLERY ET AL 3,477,936
SPUTTERING OF METALS IN AN ATMOSPHERE OF FLUORINE AND OXYGEN
Filed June 29, 1967
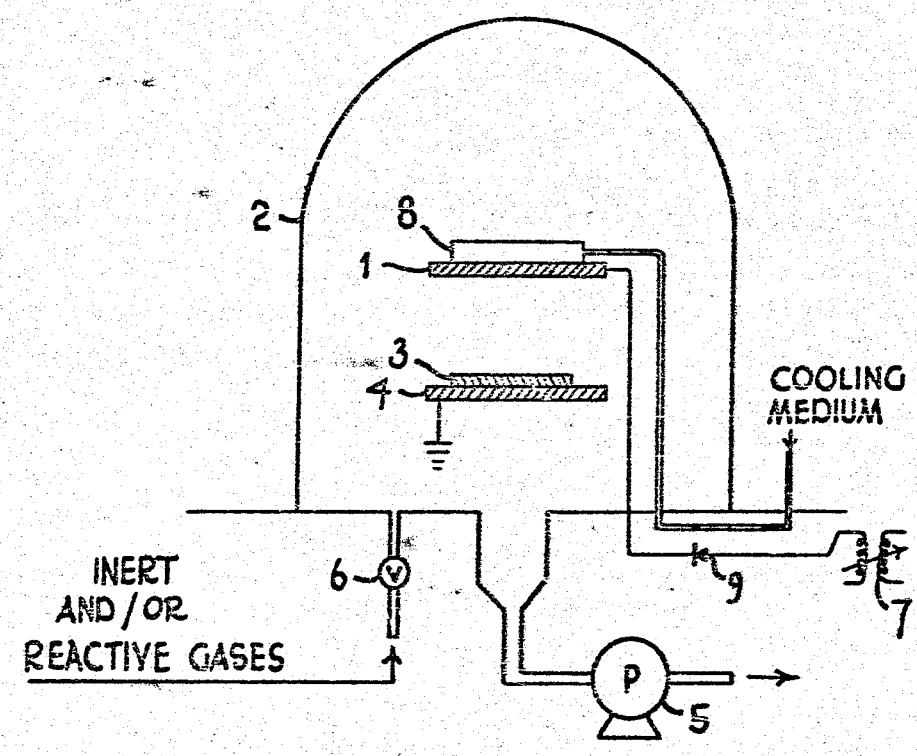
INVENTORS
F. H. GILLERY
J. P. PRESSAU
C. W. LEWIS
BY Chisholm & Spencer
ATTORNEYS 3,477,936
SPUTTERING OF METALS IN AN ATMOSPHERE
OF FLUORINE AND OXYGEN
Frank H. Gillery, Allison Park, Jean P. Pressau, Evans
City, and Charles W. Lewis, Pittsburgh, Pa., assignors
to PPG Industries, Inc., a corporation of Pennsylvania
Filed June 29, 1967, Ser. No. 649,897
Int. Cl. C23c 15/00; B01k 1/00
U.S. Cl. 204—192                                   10 Claims

ABSTRACT OF THE DISCLOSURE

The instant invention relates to a method of cathodic sputtering of metal oxide films. It particularly relates to a cathodic sputtering process in vacuo for depositing electroconductive metal oxide films "doped" with fluorine. More specifically, this invention pertains to a method of depositing metal oxide films by sputtering from a metal cathode in the presence of a gaseous fluorine-containing compound.

---

The deposition of metals and metal oxide films by cathodic sputtering is a well-known process. U.S. Patent No. 3,242,006 discloses a process for the preparation of tantalum nitride by cathodic sputtering. In such a cathodic sputtering process, the applied voltage energizes gaseous ions in the vacuum chamber and causes such ions to strike the cathode, thereby displacing a metal particle. The metal particle migrates to the substrate to be coated, said substrate frequently being an anode.

In cathodic sputtering processes, a vacuum of greatly reduced pressure is necessary to provide the proper conditions for a glow discharge to occur between the cathode and the anode. A glow discharge is necessary to the energizing of gaseous ions present between the cathode and the anode.

One alternate technique for depositing metal oxide films on a substrate comprises contacting a heated substrate with a metal salt or organometallic compound which pyrolyzes at the temperature of the substrate to form thereon an adherent metal oxide film. One disadvantage of such pyrolyzation processes resides in the elevated temperatures necessary for depositing a suitable metal oxide film. When glass is utilized as the substrate, for example, the necessary pyrolyzation temperatures approach the softening point of the glass, thereby causing undesirable optical distortion in the glass. Cathodic sputtering processes, however, do not require the substrate to be heated to elevated temperatures. Such processes are especially amenable, therefore, for producing transparent metal oxide films on high-quality optical glass substrates.

Metal oxide films, regardless of the method of application, have one disadvantage: low conductivity. Transparent tin oxide films, for example, frequently have resistivities of over 2000 ohms/square for a 6000 Å. thick film (specific resistivity of about 0.12 ohm-cm.), while pure metallic films such as tin or copper may have resistivities of less than 1 ohm/square for similar film thickness. Thin metal oxide films, however, have much better adhesion, durability, and light transmission than the pure metal films. One objective of research in this area has been the development of an adherent metal oxide film which has a conductivity approaching that of the pure metal films.

One successful approach towards improving the conductivity of a metal oxide film has involved "doping" with another metal, generally one of a higher valence. The doping of vacuum deposited tin oxide films with antimony has produced transparent tin oxide films having conductivities less than 1000 ohms/square. Such developments have been reported by Holland in his text, "Vacuum Deposition of Thin Films," Chapman and Hall, Ltd., London (1963) at page 497. The use of another metal and/or metal oxide for doping in a sputtering process, however, involves the inclusion of such a metal in the cathode. This, of course, would require cathodes of various compositions where it was desired to deposit films of similar thicknesses but of varying electroconductivities. This presents process disadvantages.

It is also known in the art that a pyrolyzed or iridized metal oxide film, for example, tin oxide, may be rendered more electroconductive by the inclusion of fluorine. In pyrolytic processes, doping with fluorine has been accomplished by contacting a hot substrate with a solution of a pyrolyzable metal compound and a pyrolyzable fluorine-containing compound such as hydrogen fluoride, ammonium bifluoride, and the like. A process of this type is disclosed in U.S. Patent No. 3,107,177.

Fluorine-containing metal oxide films have not heretofore been produced by cathodic sputtering techniques. Fluorine gas is very corrosive and cannot be effectively handled by vacuum equipment. However, a sputtering process for producing fluorine "doped" metal oxide films would be more flexible than sputtering processes utilizing a contaminant metal in the cathode as a "doping" agent.

It has now been discovered that fluorine "doped," transparent metal oxide films having resistivities as low as 200 ohms/square (specific resistivity of about 0.01 ohm/cm.) or lower may be deposited by inclusion of a fluorine-containing compound in the sputtering chamber, said fluorine-containing compound being a gas at the operating temperature and pressure of the sputtering process said being capable of decomposing in a glow discharge.

Decomposable gaseous fluorine compounds useful as fluorine carriers in the instant invention include the following fluorocarbons:

monofluoromethane
difluoromethane
trifluoromethane
tetrafluoromethane
difluoroethane
trifluoroethane
tetrafluoroethane
difluoroethylene
tetrafluoroethylene and the like. The preferred fluorocarbons have four carbon atoms or less with best results being obtained from those compounds having two or less carbon atoms. Also, it is preferred that the fluorocarbons consists of no elements other than carbon, hydrogen, sulphur, nitrogen, oxygen, and the halides. The fluorocarbons are derived, generally, by fluorination of hydrocarbons and are so named, e.g., tetrafluoromethane.

Useful inorganic fluorine compounds for the purpose of this invention include:

sulphur hexafluoride
iodine pentafluoride
nitrogen trifluoride and the like.

The preferred fluorine compounds are those in which the decomposition products of the fluorine compounds are gases. However, non-gaseous decomposition products may be prevented from becoming occluded in the deposited film by reaction with another element, for example, oxygen, to form a gaseous compound. As an illustration of this technique, oxygen may be included with a fluorocarbon in the atmosphere of the sputtering chamber to cause a reaction between the oxygen and any carbon present, forming carbon monoxide or carbon dioxide, thereby preventing the occlusion of the carbon in the conductive film. Occlusion of materials such as carbon may affect the transparency and/or the conductivity of the deposited metallic oxide film.

For a better understanding of the invention, reference is now made to FIGURE 1 which depicts a typical sputtering apparatus. The sputtering apparatus is composed of a vacuum chamber 2 which contains a cathode 1 which is preferably constructed of the metal whose oxide is to be deposited on the substrate 3. The cathode, however, may be constructed of a conductive metal oxide. The substrate 3 is supported by a substrate support 4 which may be heated to improve the properties of the metal oxide. The substrate support 4 can be grounded to form an anode. The cathode 1 is connected to a high-voltage supply 7 and rectifier 9 which create a high-potential differential between the cathode 1 and the substrate support 4 (anode). The high-potential differential provides the glow-discharge necessary to cause deposition of the metallic oxide from the cathode onto the substrate. The vacuum is obtained by a vacuum pump 5 which exhausts the vacuum chamber to a pressure of about 20 millitorr or lower. Higher pressures may be utilized, for example, up to 40 millitorr and above; however, the applied voltage may require adjusting to achieve a suitable glow-discharge.

For the purposes of this invention, the vacuum chamber is equipped with an inlet port 6 for introducing inert and/or reactive gases into the vacuum chamber. After the proper vacuum is obtained, preferably a pressure of less than about $10^{-5}$ torr, the required atmosphere for sputtering is obtained by introduction of a small amount of the desired gas which frequently comprises at least a small quantity of an inert gas. In this particular invention, a reactive gas is introduced into the vacuum chamber which contains at least one decomposable, gaseous fluorine compound.

A typical procedure for depositing a metallic oxide film utilizing the above-described apparatus involves the application of about 2500 volts to the cathode after the system has been evacuated to a pressure of about 20 millitorr. The voltage applied to the system is that necessary to obtain a suitable glow-discharge and, therefore, will vary with pressure and the like. A cathode of the dimensions of 12.5 centimeters by 12.5 centimeters is positioned 25 millimeters above a glass sample which is a 10 centimeter square. The tin cathode is cooled by cooling means 8 which is a miniature heat exchanger cooled by introduction of a cooling medium such as a cool gas or a cool liquid.

The atmosphere in the vacuum chamber may typically contain about 22 percent nitrogen trifluoride, about 26 percent oxygen, and about 52 percent argon, although wide variations of atmosphere composition are useful. The pressure of the vacuum chamber after introduction of the appropriate gases should be in the range of about 20 millitorr. The substrate temperature should be maintained in the range of about 300° C. although temperatures as low as room temperature may be used. Operation under these conditions results in formation of a transparent conductive film having a conductivity of about 1500 ohms/square after about 30 minutes of operation. A wide range of operating conditions is feasible, attended by a wide variation in the properties of deposited films.

The invention described herein is especially useful in that it is especially adaptable for producing metal oxide coatings of varying conductivities. Films of various conductivities may be achieved by varying the concentration of the decomposable fluorine compound present in the sputtering atmosphere. Also, it is known that the oxygen concentration affects the conductivity of the resulting film. Thus, by lowering the oxygen concentration in the sputtering atmosphere, the conductivity of the film may be increased. But, an increase in conductivity accomplished by a reduction of the amount of oxygen present may detrimentally affect the light transmission of the films. The resulting film would have properties approaching that of a pure metallic film which has less light transmission and less adhesion to substrates, especially glass, than a metal oxide film.

Various types of metal oxide films may be deposited by the technique of this invention. Especially good films of oxides of a metal having an atomic number between 48 and 51, for example, tin oxide, indium oxide, and cadmium oxide, may be deposited by sputtering in an atmosphere containing a decomposable fluorine compound. The conductivity of the resulting fluorine-containing metal oxide film is many fold greater than that of the undoped metal oxide film. For example, as indicated above, transparent sputtered tin oxide films generally have a mean conductivity of about 2000 ohms/square. However, fluorine "doped" tin oxide films of similar thicknesses have been produced by the teaching of this invention with conductivities of about 200 ohms/square; a tenfold increase in the conductivity (the conductivity being the inverse of the resistance of the film). Through optimization of the operating conditions, films of useful transmission having resistivities as low as 100 ohms/square or lower are producible in reasonable industrial times.

In using the term "metal oxide" it is intended to refer to the higher valent and lower valent oxides of the metal. Generally, it is the higher valent metal oxide which is present in the deposited film. However, substantial quantities of the lower valent oxide may be present. For example, tin oxide films are believed to consist primarily of stannic oxide, although minor quantities of stannous oxide may be present, especially when a deficiency of oxygen exists in the sputtering atmosphere.

The operating conditions for the sputtering process of this invention are similar to those of prior art sputtering processes. A minimum voltage of about 50 volts is required to achieve a glow discharge while a minimum voltage of about 100 volts is required to achieve a build up of metal oxide deposits within a reasonable time. A preferred operating voltage is above about 1000 volts and, for commercial operations, a voltage of over 1500 volts is recommended.

The operating pressure is generally about 20 millitorr although pressures as low as 5 millitorr are useful. Also, pressures of the order of 100 millitorr or higher may be successfully utilized. The process is operable at lower pressures in the presence of a magnetic field. The utilization of higher pressures involves increased collisions between the migrating particles and the gas atoms of the atmosphere, thereby diminishing the rate of deposition.

The content of the sputtering atmosphere may be varied considerably. An inert gas, such as argon, nitrogen, or the like, may or may not be present. If an inert gas is utilized, it may be present in concentrations of less than 1 percent by weight to about 94 percent by weight of the total weight of gases present. It is generally preferred to have an inert gas present, preferably in concentrations of about 5 percent to about 87 percent by weight of the gases present. The oxygen concentration may vary from about 90 percent or more to about 5 percent or less. As noted above, films deposited in an atmosphere of high oxygen concentration tend to have high resistivity (low conductivity) while films deposited in an atmosphere having a low oxygen concentration tend to have greater conductivity but have less light transmission. For most purposes, a preferred oxygen concentration is between about 10 percent and 60 percent by weight of the total gases present. The fluorine concentration may be also varied over wide limits. The concentration of fluorine in the atmosphere may vary from about 1 percent by weight to over 50 percent by weight of the atmosphere. A preferred range of fluorine concentration is from about 3 percent by weight to about 40 percent by weight.

Since the concentration is expressed in terms of fluorine concentration, the concentration of the fluorine-containing decomposable compound will be greater than that given for the fluorine concentration.

The production of fluorine-doped metal oxide films in a vacuum process is readily applicable to a sputtering process inasmuch as a glow discharge is required. A thermal evaporating process could not be conveniently utilized.

The following examples illustrate preferred embodiments of this invention and should not be interpreted as limiting the scope of the invention.

Example I

A sputtering apparatus similar to that illustrated in FIGURE 1 was utilized to produce tin oxide films of various conductivities. The sputtering apparatus included a cooled tin cathode of 12.5 centimeters by 12.5 centimeters. The cathode was positioned 25 millimeters above a glass sample having dimensions of 10 centimeters by 10 centimeters square. A voltage of 2500 volts D.C. was supplied to the cathode while a gas pressure of about 50 millitorr was utilized in the vacuum chamber. The following table illustrates the results obtained by depositing a metal oxide film in an atmosphere containing a decomposable fluorine compound.

TABLE I.—COMPARISON OF SPUTTERED TIN OXIDE AND FLUORINE CONTAINING TIN OXIDE FILMS

| Sample | Fluorine Compound | Gas Composition | | | | R, ohm/sq. | Time, min. | R', ohm-cm. |
|---|---|---|---|---|---|---|---|---|
| | | F. Percent | $O_2$ Percent | A Percent | A:$O_2$ | | | |
| A | $CF_4$ | 14.3 | 14.2 | 71.5 | 5:1 | 550 | 40 | 0.012 |
|   |       |      | 16.7 | 83.3 | 5:1 | 6,000 | 60 | 0.132 |
| B | $C_2H_4F_2$ | 16.7 | 33.0 | 50.3 | 1.5:1 | 450 | 30 | 0.010 |
|   |       |      | 40   | 60   | 1.5:1 | 9,000 | 60 | 0.198 |
| C | $SF_6$ | 2.3 | 26.3 | 71.4 | 2.5:1 | 280 | 60 | 0.006 |
|   |       |      | 22.2 | 77.8 | 3.5:1 | 350,000 | 60 | 7.7 |
| D | $NF_3$ | 22.1 | 25.9 | 52   | 2:1 | 1,500 | 30 | 0.030 |
|   |       |      | 33.2 | 66.8 | 2:1 | 200,000 | 60 | 4.4 |
| E | $CHF_3$ | 37 | 63 | | | 4,000 | 30 | 0.088 |
|   |        |    | 100 | | | Infinite | 30 | Infinite |
| F | $SF_6$ | 10 | 10 | 80 | 8:1 | 200 | 60 | 0.004 |

In the above table, the deposited films were about 2000 A. to about 2400 A. in thickness. The letter R' expresses the specific resistivity for each of the films. Decreasing values of specific resistivity indicate increasing conductivity.

Although specific examples of the invention have been given hereinabove, the invention is not limited solely thereto, but includes all the variations and modifications falling within the scope of the appended claims.

What is claimed is:

1. A sputtering process for depositing upon a substrate a fluorine-containing metal oxide film of a metal having an atomic number between 48 and 51 comprising sputtering in vacuo from a metal cathode in an atmosphere comprising oxygen and a gaseous fluorine compound decomposable in a glow discharge.

2. The process of claim 1 wherein the atmosphere comprises an inert gas, oxygen, and a fluorine compound decomposable in a glow discharge.

3. The process of claim 2 wherein the inert gas is argon.

4. The process of claim 5 wherein the atmosphere consists essentially of about 5 percent to about 87 percent by weight of an inert gas, about 10 percent to about 60 percent by weight oxygen, and about 3 percent to about 40 percent by weight of fluorine present as a decomposable fluorine-containing compound.

5. The process of claim 1 wherein the cathode is tin and the metal oxide film is tin oxide 6. The process of claim 1 wherein the gaseous fluorine compound decomposable in a glow discharge is selected from the class consisting of fluorocarbons having no more than four carbon atoms, sulphur hexafluoride, iodine pentafluoride, and nitrogen trifluoride.

7. The process of claim 1 wherein the sputtering is conducted at a pressure of less than about 100 millitorr.

8. The process of claim 1 wherein the gaseous fluorine compound decomposes in a glow discharge to form gaseous decomposition products.

9. The sputtering process of claim 1 wherein sputtering is achieved by application of a voltage of at least 100 volts.

10. The sputtering process of claim 1 wherein the substrate is maintained at a temperature of less than about 300° C.

References Cited

FOREIGN PATENTS 830,392   3/1960   Great Britain.

JOHN H. MACK, Primary Examiner

SIDNEY S. KANTER, Assistant Examiner

U.S. Cl. X.R.

204—164